US005918727A

United States Patent [19]

Wallace et al.

[11] Patent Number: 5,918,727

[45] Date of Patent: Jul. 6, 1999

[54] METHOD AND APPARATUS FOR COATING THREADED FASTENERS

[75] Inventors: John S. Wallace, Bloomfield; Charles M. Stempien, Walled Lake; Joseph A. Lopetrone, Sterling Heights, all of Mich.

[73] Assignee: ND Industries, Inc., Troy, Mich.

[21] Appl. No.: 08/868,953

[22] Filed: Jun. 4, 1997

Related U.S. Application Data

[62] Division of application No. 08/483,100, Jun. 7, 1995, Pat. No. 5,679,160.

[51] Int. Cl.[6] .................... B65G 15/58

[52] U.S. Cl. .................... 198/690.1

[58] Field of Search .................... 198/690.1

[56] References Cited

U.S. PATENT DOCUMENTS

| | | | |
|---|---|---|---|
| 2,897,952 | 8/1959 | Buccicone | 198/690.1 X |
| 3,003,460 | 10/1961 | Wilson | 198/690.1 X |
| 4,235,187 | 11/1980 | Mirza | 198/690.1 X |
| 4,411,724 | 10/1983 | Ito et al. | 198/690.1 X |
| 4,820,375 | 4/1989 | Memmel, Jr. et al. | 198/690.1 X |

FOREIGN PATENT DOCUMENTS

| | | | |
|---|---|---|---|
| 2680769 | 3/1993 | France | 198/690.1 |
| 2146967 | 5/1985 | United Kingdom | 198/690.1 |

*Primary Examiner*—James R. Bidwell

*Attorney, Agent, or Firm*—Liniak, Berenato, Longacre & White, LLC

[57] ABSTRACT

An apparatus for providing a barrier coating on a portion of discrete objects such as fasteners utilizing a liquid coating material is provided. The present invention introduces either a plurality of loose or interconnected parts onto a magnetized conveyor system and optically senses when parts are present. When parts are sensed, the sensor triggers a discrete shot of liquid coating material such as a fluorocarbon to be deposited onto a predetermined portion of each part. These parts can then be transferred to a second magnetized conveyor system that supports an opposite surface of the parts than the first conveyor. The invention can also remove excess coating material and also be provided with dryers or heaters to fix the coating material to the parts if necessary.

33 Claims, 6 Drawing Sheets

44
48
78
82
80
40
42
30
28
32
76
72
74
101
70
24
34
12
10
69
68
100
66
62
64
60
56
26
21
52
98
38
50
14
4A
54
88
46
36
84
102
86
20
16
25
18

METHOD AND APPARATUS FOR COATING THREADED FASTENERS

This is a division of application Ser. No. 08/483,100, filed Jun. 7, 1995 U.S. Pat. No. 5,679,160.

BACKGROUND OF THE INVENTION

The present invention generally relates to discrete parts having a useful barrier coating applied to a portion thereof and a method and apparatus for processing parts such as threaded fasteners with such a coating material. More particularly, the invention relates to the deposition of liquid fluorocarbon or hydrocarbon type coating materials in a precise, continuous and high speed manner onto selected surfaces of metal fasteners to form a barrier coating on the fasteners. A particular application of the invention is the application of liquid fluorocarbon coating material to the internal threads of a nut.

In many industries, metal parts are being increasingly exposed to electrodeposition paints, primers and corrosion resistant materials. For example, recent advances in improving the corrosion resistance of automobile bodies have made the use of formulations such as Uniprime®, made by PPG Corporation for the treatment of steel structural members, a standard in the industry. Many fastening elements are permanently attached to basic vehicle structural components prior to processing of the components with electrodeposited primers, paints and rust inhibitors. Therefore, any exposed threads of fasteners attached to such vehicle components may become contaminated, making it difficult or impossible to thread such exposed fasteners with a mating fastener for subsequent assembly. The need therefore arose to develop a way of preventing contamination of these exposed fastener threads that would not substantially interfere with the ultimate performance of such fasteners.

The prior art has proposed a variety of coating systems to attempt to solve the problem of resisting corrosion inhibitor build up on the threads of fasteners. Each of these known systems, however, has suffered from some rather substantial drawbacks. Several alternative methods have been proposed for the coating of the threads of internally threaded fasteners including pierce nuts and weld nuts that utilize liquid epoxy paints or other fluorocarbon coating materials that include Teflon® and an organic solvent.

In one of the earliest of these known methods, a liquid Teflon® coating material containing FEP and a solvent was sprayed onto the threads of a nut using a small high pressure nozzle. The fastener was then heated to a temperature of about 450° F. for twenty minutes vaporizing the organic solvent and curing the remaining fluorocarbon material. This method had several disadvantages.

First, with the pressurized spraying techniques used by this method, the coating material impacted the sprayed area at relatively high speeds causing bounce back of some of the material and non-uniform coating or coating of undesired surfaces. Second, because the fluid suspension had to be relatively dilute to avoid clogging of the spray nozzle, the coating at times ran off prior to curing. Third, substantial portions of the expensive fluorocarbon were wasted as excess fluid suspension was applied and dripped down or ran off the fastener prior to curing.

Several liquid fluorocarbon coating systems have been devised to address some of these problems, but these solutions have introduced new problems and limitations. U.S. Pat. No. 4,652,468 to Gould et al. discloses a process for high pressure impact coating of threaded openings of fasteners that attempts to avoid the deposition of coating material on any other surfaces of the fastener. This process requires a masking of the surfaces of the nut in order to restrict the coating material from contaminating the outer surfaces of the nut. Additionally, this process required a choked area for drawing any excess coating material from the opening of the nut. The mandrels and seals utilized to mask fastener surfaces other than the threads have a tendency to wear out quickly due to abrasion and solvent attack. Also, the need to index, mask and remove excess material during the coating process of Gould is complicated, expensive and slows processing speeds.

U.S. Pat. No. 4,701,348 to Neville discloses a method of coating the threads of an internally threaded fastener. Neville requires a metering device with a nozzle to be selectively introduced and removed from a succession of internally threaded fasteners. The reciprocating movement of the nozzle necessitates an indexing of the fasteners that stops the flow of fasteners each time coating material is being applied to any single fastener dramatically slowing processing rates. Furthermore, the nozzle has an ultrasonic tip which is vibrated after the metering of a drop of coating material in order to explode the drop and cause a fine mist of the fluid suspension to be sent toward the threads of the nut. Due to the difficulty in metering identically sized drops in succession and exploding them in the exact same manner using an ultrasonic power source, this system often exhibits uneven coating of the fasteners.

Published PCT International Application No. WO8906757 of Prittinen et al. discloses a method and apparatus for coating internally threaded fasteners with materials such as Teflon®. This invention provides an indexed flow of fasteners before an application device that introduces a reciprocating rotary probe into each fastener to be coated. The rotary probe has an opening that deposits a layer of coating material on a preselected portion of the threads of each fastener utilizing a combination of pressurized spraying and centrifugal force. The liquid Teflon® coating material emitted from this spray probe is difficult to control. This system is incapable of operating at relatively high production rates since it requires fasteners to be indexed and stopped in place during the entire time of application of the coating material.

Other known solutions, such as those taught by U.S. Pat. No. RE33,766 to Duffy et al. have utilized a stream of powdered Teflon material sprayed onto preheated fasteners. Such systems require a great deal of heat to be applied to the fasteners prior to exposing them to a stream of Teflon powder. The heat utilized in raising the temperature of the fasteners to approximately 700° F. or greater can be both expensive to generate and potentially detrimental to the finish or appearance of the subsequently coated fastener. Due to the inherent difficulties of attempting to adhere powdered Teflon® type coating materials, this system generally requires all parts to be cleaned, pickled or plated prior to powder application in order to obtain minimal acceptable adhesion. Production rates in such systems are further limited since a reciprocating rotatable nozzle must be introduced and removed into each internally threaded fastener opening and powder pressure and flow through the multiple nozzles of this system is difficult to maintain in a consistent and uniform manner.

Other liquid material delivery systems such as taught in applicant's copending application Ser. No. 08/270,598 filed Jul. 5, 1994 are also known. Such systems feature high speed accurate delivery of liquid materials such as PVC liquids onto a continuously moving succession of preheated parts.

Such systems have not contemplated the application of fluorocarbon or Teflon® type barrier coating materials onto the threads of fasteners to prevent electrodeposition of paints or corrosion resistant materials.

Subsequent use of vibratory feed mechanisms to feed fasteners coated with fluorocarbon type material by these prior art systems to assembly machines has sometimes caused loosening of the coating material. Yet a further problem is created by robotic assembly devices that are now frequently being used in many industries. These robotic assembly devices attach fasteners to structural components. There is an increasing desire, however, to utilize fasteners in such devices in the form of a roll of nuts connected by metal filaments, rather than having the nuts individually presented in loose form to the robotic device.

The individual nuts on these rolls often require fluorocarbon barrier coatings on the threaded surfaces thereof. The ability to feed the coated nuts in the form of an interconnected roll can eliminate the aforementioned loosening of the coatings caused by vibratory feed systems. A further drawback of existing prior art devices is that most of the known methods for the application of fluorocarbon type materials cannot accommodate nuts in the form of a roll-of nuts connected by metal filaments, other than by removing all of the nuts from the filaments which is prohibited.

It is therefore apparent that there exists an overwhelming need in the art for an improved apparatus and method of coating the threads and/or other portions of a fastener or other discrete object that overcomes the drawbacks of prior liquid and powdered fluorocarbon deposition systems and features increased quality of coating, increased production rates and the ability to alternatively process fasteners presented individually or in the form of a roll of fasteners connected by metal filaments with equal ability.

SUMMARY OF THE INVENTION

It is therefore an object of the present invention to provide an improved method and apparatus for the application of liquid masking, insulating or lubricating substantially pinhole free barrier coatings on discrete objects that overcomes the problems posed by prior art systems.

A further object of the present invention is to provide an improved method and apparatus for providing a barrier coating on the threaded surfaces of a succession of fasteners that does not require intermittent stopping of the feed of fasteners as they travel through the coating apparatus.

A further object of the present invention is to provide an improved method and apparatus for providing a barrier coating on the threaded surfaces of a fastener that features precise metering and location of a deposit of the liquid material applied to the fastener.

Still another object of the present invention is to provide an improved method and apparatus for the application of a barrier coating onto the threaded portion that requires little or no preheating of the fasteners It is still a further object of the present invention to provide a method and apparatus for the application of a barrier coating of liquid material onto the threads of an internally threaded fastener that does not require a nozzle to be introduced within the opening of the threaded fastener.

It is also an object of the invention to provide a method and apparatus for coating the threads of a fastener with a barrier coating at production rates far faster than those attainable in the prior art.

Yet another object of the present invention is to provide a method and apparatus for coating the threads of a fastener that provides a barrier coating on the fastener protecting, lubricating, insulating and masking the threads from unwanted contamination or deposition of material thereon that does not require rotation of the material applying element during the coating process.

It is yet another object of the present invention to provide a method and apparatus for coating the threads of a fastener with a barrier coating that can easily accommodate fasteners fed loosely or in the form of a continuous roll of nuts connected by metal filaments.

Still a further object of the present invention is to provide a method and apparatus for coating the threads of a fastener that can accomodate a succession of irregularly spaced centered fasteners The above and other objects, which will become apparent after reviewing the detailed description, are achieved by utilizing the method and apparatus of coating the threads of a fastener of the present invention In one aspect of the invention, individual articles such as nuts are deposited onto a continuously moving conveyor in a uniform orientation with a belt that travels over a magnetic rail that maintains the fasteners in contact with the belt. The fasteners are continuously fed in a uniform high speed manner past a liquid coating material deposition area where optical sensors trigger precisely metered discrete shots of material to be deposited onto specific locations of the threads of the fasteners in order to form a barrier coating thereon. With the barrier coating material deposited on the fasteners, they are then transferred to a second conveyor system having a magnetic rail and a belt thereover in an opposite orientation where coating material deposited on the threaded surfaces of the fasteners is dried or heated in order to stabilize the coating and vaporize the organic solvent contained in the coating material.

In another preferred embodiment of the present invention, a fastener cleaning station is included and utilized prior to depositing any coating material onto the fasteners and a station is provided to remove any excess coating material that may have been deposited on surfaces of the fasteners other than the threaded surface prior to heating or drying off of the solvent from the coating material.

In another embodiment of the present invention, the fasteners are fed, processed with barrier coating material and removed from the apparatus in the form of a continuous roll of nuts connected by metal filaments. The nuts presented in this form in this embodiment of the invention continue to move through the entire apparatus at a constant rate of speed and do not have to be stopped for the deposition of coating material to occur.

BRIEF DESCRIPTION OF THE DRAWINGS

The invention will now be described further in connection with the attached drawings wherein like reference numbers refer to corresponding parts throughout the several views of preferred embodiments of the invention and wherein.

DETAILED DESCRIPTION OF THE INVENTION

While the present invention will be described particularly with respect to applying fluorocarbon or Teflon® type material to form a continuous, substantially pinhole free barrier coating on the threads of threaded articles, it is to be understood that the present invention can be utilized to apply to a variety of fluorinated ethylene propylene copolymers or other similar type materials such as silicones, waxes and petroleum greases. The present invention contemplates supplying the coating material as a fine unpolymerized powder material in an epoxy paint containing a fluid solvent. Additionally, while the invention contemplates providing coatings on a variety of discrete metal objects and threaded articles and/or fasteners including, but not limited to, nuts, bolts and similar articles, the present invention will be described for exemplary purposes only with reference to a nut. Also, although the invention will be described in connection with providing a coating on substantially all of the threads of a threaded fastener, it is also to be understood that such coating could be placed on a limited number of threads and/or be provided on non-threaded surfaces if so desired.

Figures 1, 2, 3:
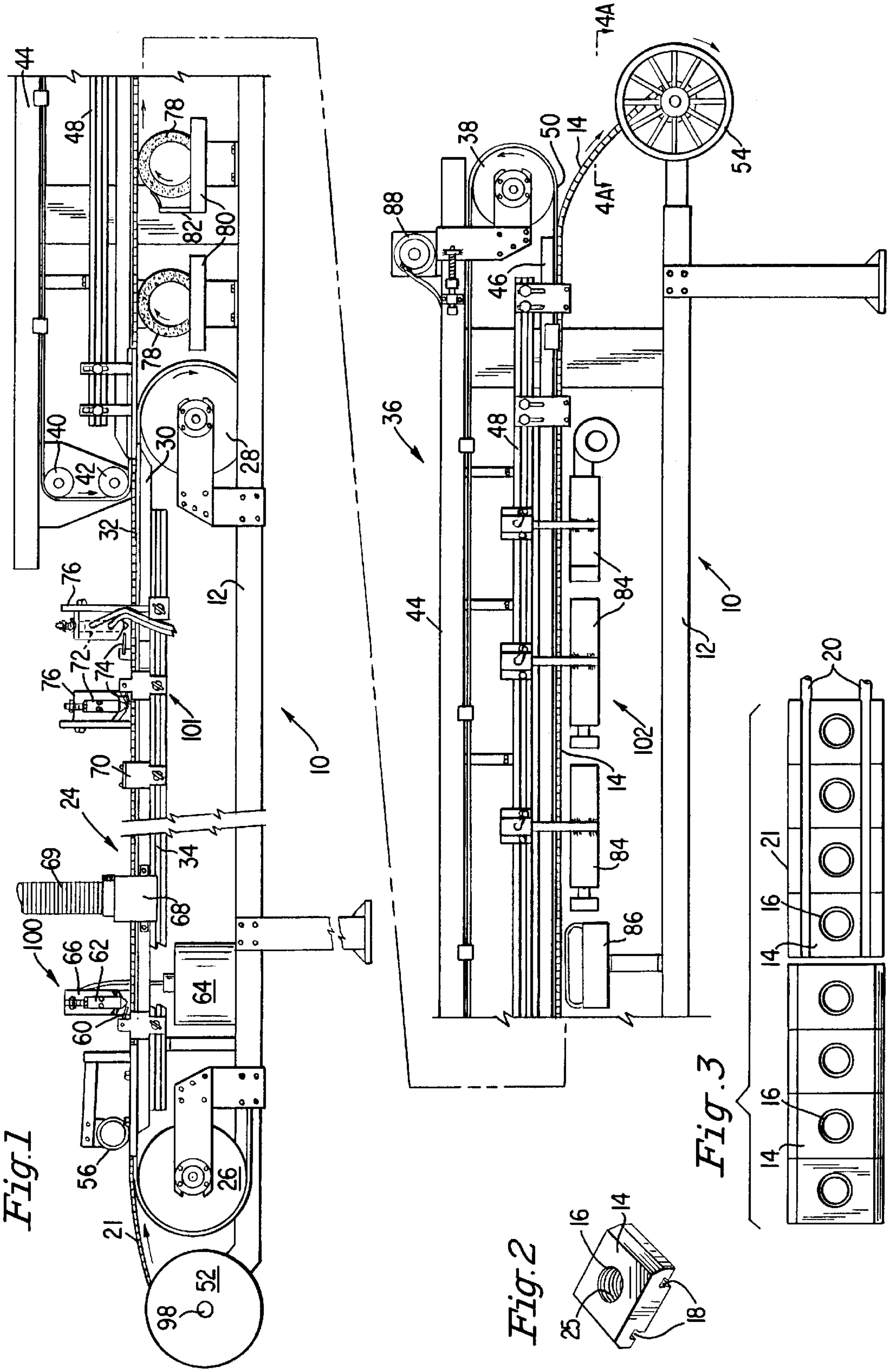
FIG. 1 is a side view of one embodiment of the present invention.
FIG. 2 is a perspective view of a nut having coating material applied to all threads.
FIG. 3 is a combination top and bottom view of a plurality of nuts illustrated in the form of a strip of nuts connected by metal filaments.

FIG. 1 generally illustrates one preferred embodiment of the apparatus 10 for practicing the present invention. The apparatus 10 functions to achieve the process steps of the present invention. The apparatus 10 has a frame 12 that serves as a mounting base for a lower conveyor system 24 and an upper conveyor system 36 that has one end that partially overlaps one end of the lower conveyor system 24. The lower conveyor system 24 has two conveyor wheels 26 and 28 respectively that have a continuous conveyor belt 32 running therebetween. The belt 32 can be constructed of a number of different materials provided that they exhibit good heat resistance and provide a non-stick surface. A particularly preferred belt has been found to be a Teflon coated fiberglass solid belt that is approximately 2 inches wide and approximately 0.014 to 0.050 inches thick. The belt 32 may have a solid, perforated or mesh construction. A variable speed motor operating the wheels 26 and 28 allows the speed of the belt to be selectively adjusted to a desired consistent speed.

The lower conveyor system 24 provides a magnetic rail 30 that runs along substantially the entire length of the belt 32 onto which the nuts 14 are introduced between the wheels 26 and 28. The magnetic force from the rail 30 beneath the belt 32 serves to attract and hold ferrous nuts 14 against the top surface of the belt 32 so that the tractive force of the belt 32 will cause the nuts 14 to move continuously with the belt 32 in a stable fixed manner at a consistent speed. The magnetic rail 30 further serves to hold the fasteners 14 substantially flat against the belt 32 so that no further devices are needed to attach the nuts 14 to the belt 32 for processing.

The structure of the conveyor system 24 has proven to be very effective in providing a continuous stream of nuts 14 in a very consistent position thereby enabling coating materials to be applied to the nuts 14 while using very high belt speeds. The conveyor system 24 is also provided with an accessory rail 34 which provides a point of attachment to the base 12 for various cleaning, heating or application devices which will be described later in detail.

The upper conveyor system 36 is similar in construction to the lower conveyor system 24 and is mounted to the frame 12 using a subframe 44. Like the lower conveyor system 24 previously described, the upper conveyor system 36 utilizes a variable speed motor 88 that drives a continuous belt 50 between the conveyor wheels 38, 40 and 42 respectively. The belt 50 is of a type and construction similar to the belt 32 previously described. A magnetic rail 46 is provided above substantially the entire length of the belt 50 and runs between the wheels 42 and 38 that the fasteners 14 will contact. This results in the fasteners 14 being attracted to and retained on the belt 50 and being pulled along the length of the rail 46 by the tractive force of the moving belt 50. An accessory rail 48 is provided to mount additional devices such as blowers or heating systems.

The upper conveyor system 36 is mounted downstream from and above the lower conveyor system 24 in a partially overlapping manner. As the nuts 14 travel along the lower conveyor system 24, their top surfaces are exposed and their bottom surfaces rest against the belt 32. As the nuts 14 continue to traverse along the device 10 and encounter the upper conveyor system 44, the previously exposed top surfaces of the nuts 14 then contact the belt 46 of the upper conveyor system 44 and the bottom surfaces of the nuts 14 which had been in contact with the belt 32 are then exposed.

The embodiment of the present invention illustrated in FIG. 1 will now be described in detail by tracing the path of fasteners through the apparatus 10 with reference to FIG. 1 and FIGS. 4–12. This embodiment of the present invention will be described, for exemplary purposes only, in connection with nuts 14 such as pierce nuts that have a threaded hole 16 and are joined together by metal filaments 20 that pass through the slots 18 of successive nuts 14 as illustrated in FIGS. 2 and 3.

A coiled strip 21 of nuts 14 is provided on a spool 52. The spool 52, on which the strip 21 is wound, has a hub with a center hole. The spool 52 is suspended on a shaft 98 mounted on the frame 12. The spool 52 is allowed to spin freely on the shaft 98 and is further preferably allowed some freedom of movement from side to side. The shaft 98 is often connected to a semiautomatic motorized decoiler that senses tension to thereby maintain an adequate and consistent feed of the strip 21.

Figures 4, 4A:
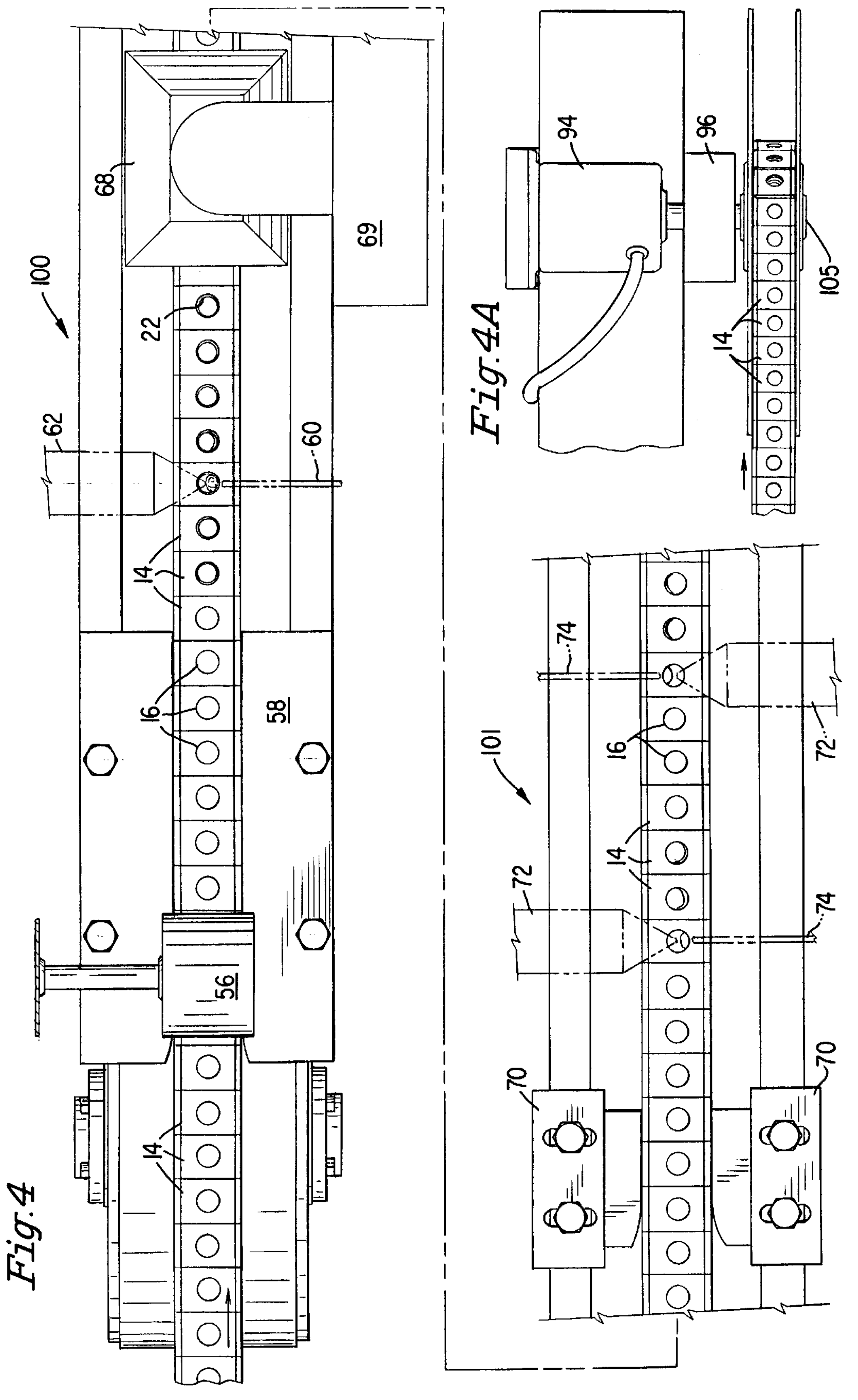
FIG. 4 is a top view of a portion of the apparatus illustrated in FIG. 1.
FIG. 4A is a top view of the take-up spool system of the embodiment of the invention illustrated in FIG. 1.

As illustrated in FIGS. 1 and 4, the leading end of the strip 21 of nuts 14 is set into the centering guides 58 and under the rotating pressure wheel 56 which urges the nuts 14 into contact with the upper surface of the belt 32. The magnetic force of the rail 30 attracts the ferrous nuts 14 to the conveyor 32 and results in the strip 21 of nuts 14 then being pulled off the spool 52 by the tractive force of the moving conveyor belt 32. The present invention is capable of pulling a strip 21 of nuts 14 along the belt 32 at a variety of different speeds with the most preferred speeds being on the order of about 17 feet per minute for M6 pierce nuts. The present invention contemplates belt speeds that enable the processing of about 30,000 to as high as 80,000 nuts per hour depending upon the type and size of the nuts.

As the strip 21 of nuts 14 is pulled further from the spool 52, the nuts 14 next encounter an on-line cleaning station referred to generally as 100. Prior to coating the nuts 14, it is sometimes necessary to loosen surface oil or dirt from the threaded areas 16 of the fasteners 14 prior to coating. To accomplish this purpose, one or more guns, such as gun 62, are provided. A preferred gun for this purpose has been found to be a Nordson zero cavity gun with a no. 27655 module manufactured by the Nordson Corporation of Norcross Ga. The gun 62 is mounted on a stage 66 that is capable of adjustment in at least three different axes. This enables precise adjustment of the gun 62 to accommodate a wide variety of different fasteners or other parts. The stage 66 is mounted to the accessory rail 34.

The gun 62 is supplied with solvent from the supply container 64. An optical sensor 60 is mounted to the rail 34 opposite the gun 62. When the sensor 60 senses a threaded hole 16 of nuts 14, it triggers a discrete shot of an appropriate type of rapid evaporating solvent to be precisely delivered onto the threads 25 of the detected fastener 14. A particularly preferred sensor for this purpose has been found to be a model no PZ-101 manufactured by Keyance Corporation. Although a variety of different solvents can be used for this purpose, a particularly preferred solvent has been found to be methyl ethyl ketone (MEK). Once applied to the nuts 14, the solvent is given sufficient time as the strip 21 continues to traverse through the device 10 on the belt 32 to loosen any surface oil and dirt that may be on the threaded surface 16 of the nut 14.

The strip 21 of nuts 14 then enters an exhaust enclosure 68 where two blow off ports are utilized to blow air into the threaded hole 16 causing the solvent and loosened dirt and oil to atomize and be sharply blown out of the now clean threads 25 of the fasteners 14. The atomized material that is blown off is carried away from the device through a vacuum tube 69. After exiting the exhaust system 68, the nuts 14 are allowed some additional time for any solvent remaining on the threads 25 to dry prior to the application of any coating material. If additional drying capacity is needed, an air blower or heater could be added to the conveyor system 24 in this area.

In the alternative, the gun 62 of the on-line cleaning station 100 can be used to deliver discrete shots of solvent such as N methyl pyrrolidone (NMP) onto the threads 25 of each detected fastener 14. In this situation, the blow off ports of the exhaust enclosure 68 are not used and the solvent remains on the fasteners 12 to act as a wetting agent and improve the wicking of the subsequently applied liquid coating material 22. In either case, once the strip 21 of nuts 14 leaves the area of the exhaust enclosure 68 it is then passed through a centering guide 70 to insure proper positioning for subsequent coating.

As the strip 21 of fasteners 14 is carried further down the belt 32, it next encounters the liquid application section designated generally as 101 of the device 10. In this section, one or more liquid applicator guns 72 are provided for applying liquid coating material 22 such as a suspension of a fluorocarbon in a liquid solvent to successive nuts 14 on the strip 21 that pass by the guns 72. Each of the guns 72 is attached to the device 10 by a stage 76. The stages 76 allow the guns 72 to be selectively secured in fixed locations for the application of liquid coating material 22 to different size or shape nuts 14. Preferred stages for use in connection with the present invention allow adjustment of each gun 72 along two or three different axes.

As a result, the stages enable the vertical distance between the gun 72 and the conveyor belt 32, the horizontal location of the gun 72 in relation to the width of the belt 32 and the angle and direction of the gun 72 with respect to the nuts 14 to be adjusted. This permits the present invention to process many different types and sizes of parts with a minimum of set up time being required. A commercially available stage that meets these requirements is the 4500 Series ballbearing stage manufactured by Daedal Division of Parker Corporation of Harrison City, Pa.

The guns 72 are capable of delivering accurate high speed metered shots of a wide variety of liquid coating materials. These materials include, but are not limited to, fluorocarbons, hydrocarbon and fluorocarbon copolymers, silicones, waxes, petroleum greases, Teflon® and Teflon® type materials. Two particularly preferred materials have been found for use in connection with the present invention. The first is a mixture of about 70% by volume Du Pont Teflon®-S (#954-101) liquid and about 30% DuPont T-8748 thinner. The second is a mixture of about 70% by volume Whitford XYLAN 1661 dry film lubricant manufactured by Whitford Corporation of Frazer, Pa. and about 30% of a solvent mixture containing about 60% N methyl pyrrolidone (NMP) and about 30% XYLENE®. The guns 72 have very high cycle speeds with a particularly clean cut-off at the end of each discrete shot. This is critical to maintaining the present invention's desired combination of high production speeds and precise and accurate delivery of coating materials to a desired portion of a succession of nuts 14.

It is preferred that the guns 72 used be fully capable of applying at least 20,000 and preferably 50,000 to 80,000 discrete metered shots of coating material 22 per hour. Although a variety of different guns 72 can be used in connection with the present invention, a particularly preferred gun has been found to be the Nordson Zero Cavity gun having a Nordson 276515 gun module. The guns 72 preferably utilize a nozzle diameter in the range of between 0.008" and 0.040" and are supplied with coating material under a pressure of about 40 lbs/sq. inch. As can be appreciated, it is also possible to use only a single gun 72 and a single discrete shot of material in connection with the present invention or more than two guns that would deliver more than two discrete shots of material 22 onto a series of nuts 14. In addition, the present invention can also be utilized to place discrete shots of material 22 on surfaces other than the threads 25 of nuts 14. The guns 72 can also be primed or cleaned without any parts present.

Figure 6:
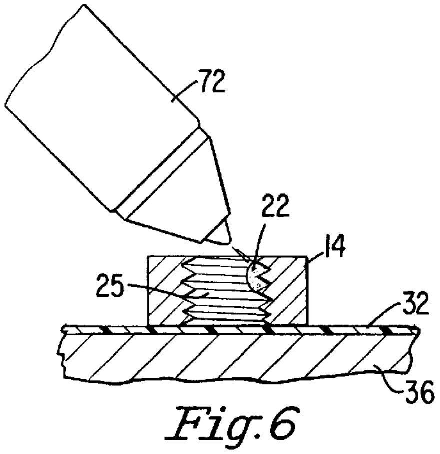
FIG. 6 is a partial cross sectional view of the first shot of coating material being applied to the threads of a fastener in accordance with the present invention.
Figure 7:
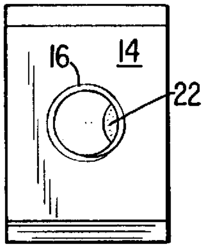
FIG. 7 is a top view of a fastener shortly after deposition of a single discrete shot of coating material having been applied to a portion of the threads of the fastener.

As particularly illustrated in FIGS. 4, 6 and 7, as the strip 21 of fasteners 14 moves into the application section 101, the threaded hole 16 of each of the respective nuts 14 is detected by photo-optic sensors 74. Although a variety of different photo-optic sensors are capable of being utilized for this purpose, it has been found that a particular preferred sensor for use in the present is manufactured by Keyance Corporation under the model no. PZ-101. Once the sensor 74 detects the threaded hole 16 of each successive nut 14, it sends an electrical signal to the gun 72 which fires a discrete shot of liquid coating material 22 onto a portion of the threads 25 of each nut 14 Once deposited, the first shot of coating material 22 flows down the threads 25 toward the bottom of the nut 14 and also, as a result of capillary action, flows somewhat upward along the threads 25 as well.

Figure 8:
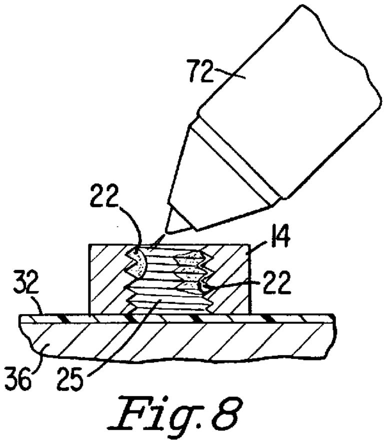
FIG. 8 is a partial cross sectional view of the fastener illustrated in FIGS. 6 and 7 having a second discrete shot of coating material applied to its threads.
Figure 9:
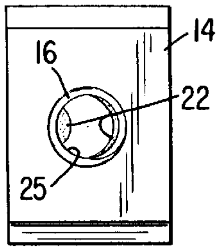
FIG. 9 is a top view of the fastener illustrated in FIG. 8 shortly after deposition of a second discrete shot of coating material onto the threads.
Figure 10:
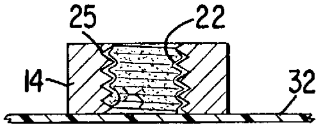
FIG. 10 is a partial cross sectional view of the fastener illustrated in FIGS. 8 and 9 a short time after the second discrete shot of coating material has been applied to the threads.
Figure 11:
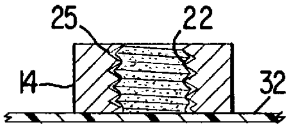
FIG. 11 is a partial cross sectional view of the fastener illustrated FIG. 10 a short time after when the coating material has covered substantially all of the threads.

As this first deposit of material 22 is flowing around the threads 25, the nut 14 passes a second optical sensor 74 and gun 72 mounted on a stage 76 as previously described. As the nut 14 passes the second gun 72, a second discrete shot of coating material 22 is deposited circumferentially apart from and preferably 180° apart from the location of the first shot of coating material 22, as illustrated in FIGS. 8 and 9. As best illustrated in FIGS. 1, 10 and 11, once the appropriate coating material 22 is deposited on the nut 14, it is carried further by the belt 32 away from the application section. During this period of time, the applied liquid coating material 22 wicks around the threaded opening 16 and covers all of the threads 25 in a substantially even manner.

The location, amount, speed and pressure of material 22 that is deposited is controllable by the guns 72. The minimum amount of liquid coating material 22 sufficient to wick around and cover all of the threads 25 is in totality shot into the threaded hole 16. By accurately positioning and metering these shots of material 22 from the guns 72, the material 22 is substantially entirely confined within the threaded hole 16 and does not extend onto either the belt 32 or any other surfaces of the nut 14 other than the threads 25.

Most specifications for the application of fluorocarbon barrier coatings on fasteners require that the entire threaded surface be covered with coating material 22. Therefore, to form such a substantially pinhole free coating, the metered shots of coating material 22 in accordance with the present invention are usually sufficient to insure that there is enough material 22 deposited to wick around all of the threads 25. This can sometimes cause a small amount of excess material 22 to build at the bottom threads 25 of the nuts 14 possibly wicking onto the belt 32.

Figures 13, 14:
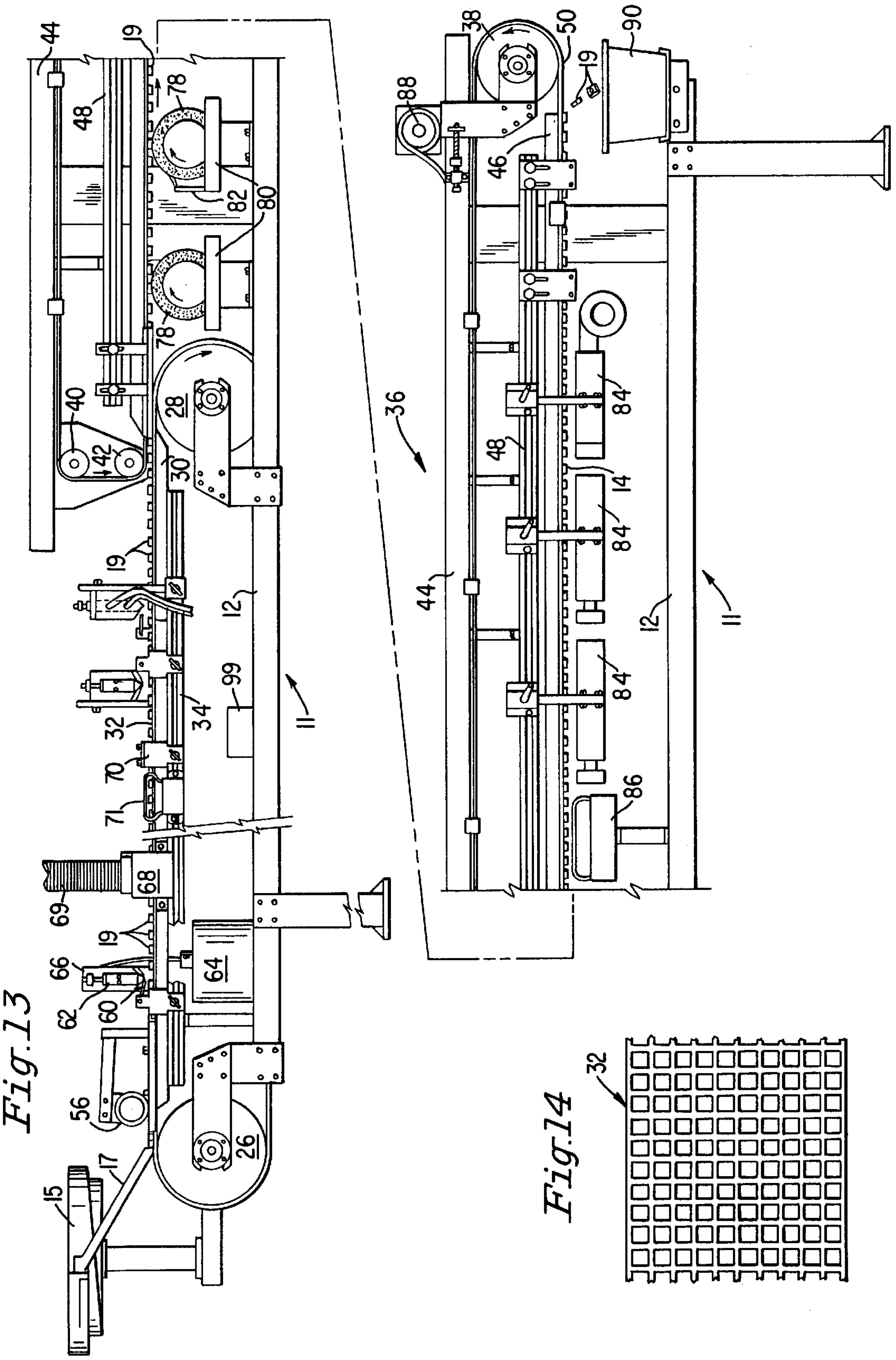
FIG. 13 is a side view of another embodiment of the present invention that presents a succession of loose fasteners for coating by the present invention.
FIG. 14 is a partial top view of a mesh belt that can be utilized in connection with the present invention.
Figure 15:
FIG. 15 is a perspective view of a clinch nut that can be coated utilizing the present invention.
Figure 16:
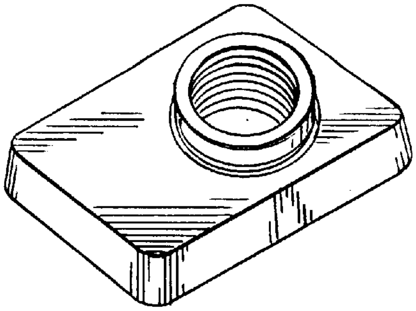
FIG. 16 is a perspective view of a stamped nut that can be coated utilizing the present invention.
Figure 17:
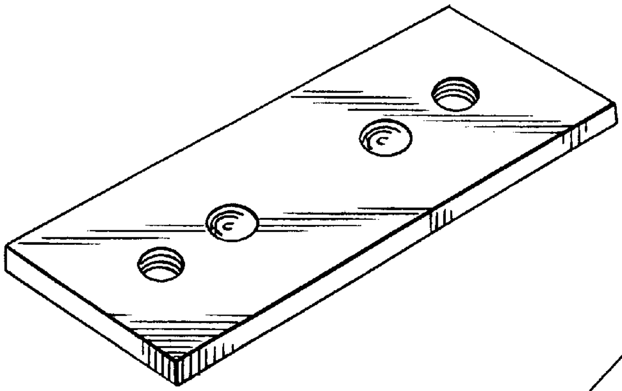
FIG. 17 is a perspective view of a tapping plate that can be coated in accordance with the present invention.
Figure 18:
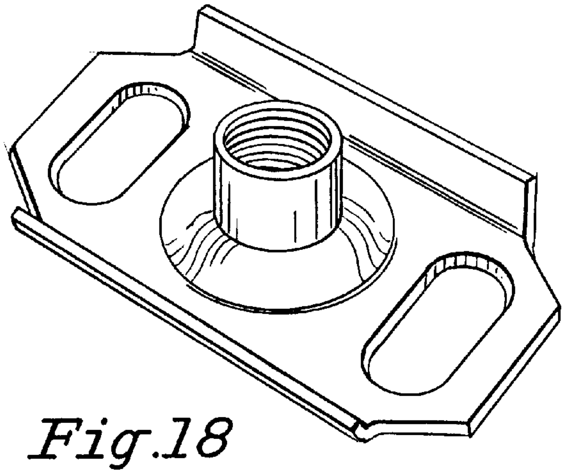
FIG. 18 is a perspective view of an additional fastener that can be coated in accordance with the present invention.

The present invention provides two separate features for dealing with this potential problem. First, the belt 32 can be provided with a meshed construction as illustrated in FIG. 14. This belt construction still provides proper support for the nuts 14, but at the same time minimizes the amount of surface area of the belt 32 that comes into contact with the bottom surface of the nuts 14. In this manner, excess material 22 that may be present at the bottom of the threads 25 makes little or no contact with the belt 32 and is therefore usually retained on the threads 25 due to surface tension effects.

Figure 5:
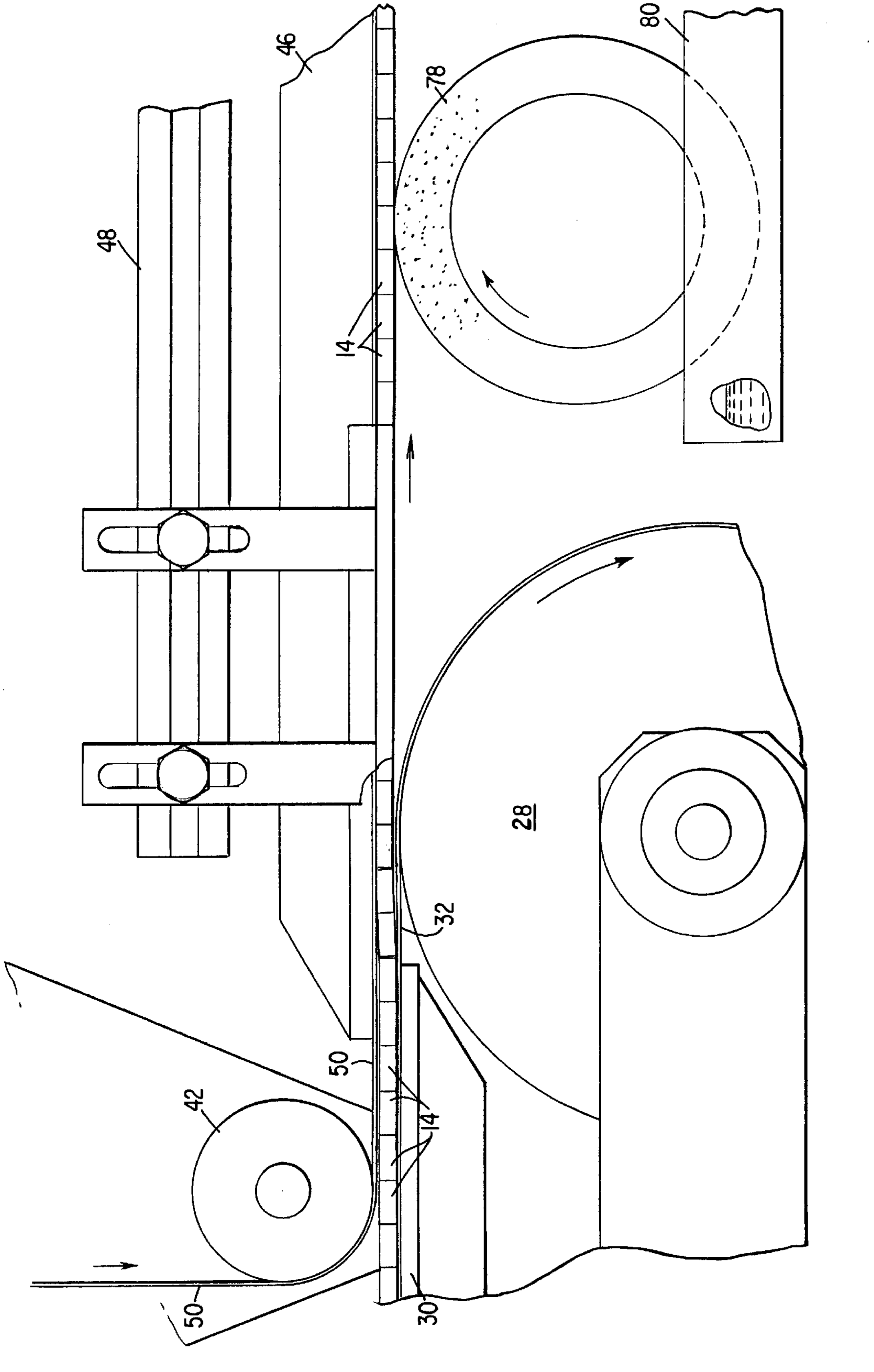
FIG. 5 is a partial side view of the transitional area between the first and second conveyor systems of the present invention.

A second feature for dealing with the potential of excess material 22 building up at the bottom of the threads 25 of the nuts 14 is best illustrated in FIGS. 1 and 5. The lower magnetic rail 30 is constructed so that its magnetic effect on the nuts 14 fades out before the end of the lower conveyor system 24 and simultaneous to the nuts 14 passing under the beginning of the upper conveyor system 36 and the upper magnetic rail 46. This construction allows the upper magnetic rail 46 to attract and lift the nuts 14 off of the lower conveyor system 24 and onto the belt 50 of the upper conveyor system 36 and subsequently be carried further along the device 10 by the tractive force of the belt 50.

As the nuts 14 travel along the upper belt 50 their top surfaces are in contact with the belt and their bottom surfaces are completely exposed. In order to facilitate the nuts to start conveying along belt 50, the speed of the belt 50 is synchronized with the speed of the lower belt 32. A centering guide similar to the centering guide 70 previously described may also be utilized in this area to assist in accurate transfer of the nuts 14 from the lower conveyor system 24 to the upper conveyor system 36.

Figure 12:
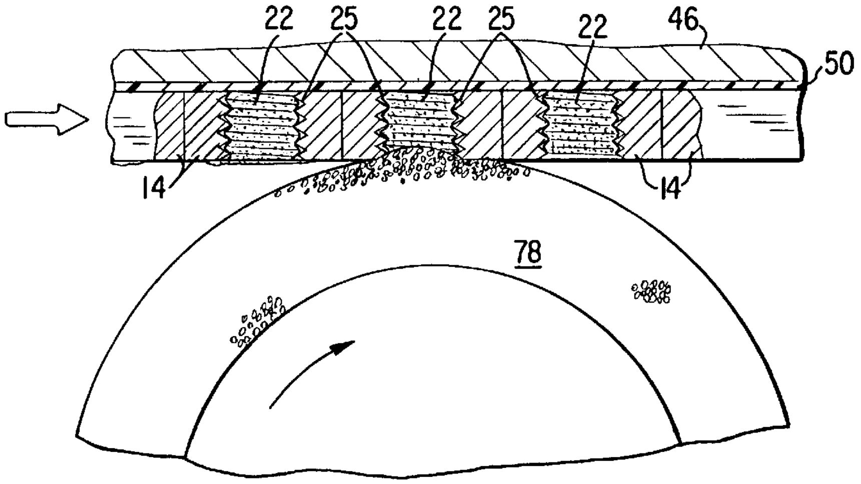
FIG. 12 is a partial cross sectional view of the apparatus of the present invention for removing coating material from unwanted surfaces.

If there is concern that either excess coating material 22 has been applied to the threaded hole 16 of the nuts 14, or that some of the applied liquid coating material 22 may migrate out of the threaded hole 16 onto the outside surfaces of the nut 14, then the present invention provides an additional system illustrated in FIGS. 5 and 12 for solving such problems. As the strip 21 of nuts 14 traverses further along the upper belt 50 and encounters one or more blotters 78. The blotters 78 preferably take the form of soft foam wheels rotating under the nuts 14 and pressing lightly on the bottom surface of each successive nut 14 to remove and carry away any excess coating material 22.

It is generally preferred that the rotational speed of the blotters 78 be synchronized with the belt speed carrying the nuts 14 so that there is no wiping action on the surface of the nuts 14. However, in certain applications it may be desirable to move the blotter wheels 78 asynchronously to effect a wiping action on the bottom of successive nuts 14. As the blotter 78 rotates away from the belt 50, it becomes partially submerged in a tank 80 containing a solvent such as methyl ethyl ketone (MEK) or a mixture of NMP and XYLENE which cleanses the blotters 78 of any excess coating material 22 between presentations of the same section of blotter 78 to successive nuts 14. If additional cleaning of the blotter 78 is needed, then a knife-like scraper 82 can be added to remove remaining excess coating material 22 from the surface of the blotter 78 prior to successive contacts with additional nuts 14.

Once any coating material 22 that may have migrated outside of the threaded hole 16 of the nuts 14 is removed, the nuts 14 then travelling on the belt 50 are conveyed through a drying section 102, as illustrated in FIG. 1. This drying section can take the form of one or more air blowers 84, heaters 86 or combinations thereof. The heaters 86 can take the form of infrared, radiant or induction heating elements. One or more vacuum ducts can also be provided in the drying section to draw solvent fumes away. The purpose of the drying section 102 is to. accomplish sufficient flashing off of the solvent contained in the coating material 22 in the nut 14 to stabilize the coating.

Once the belt 50 moves the fasteners beyond the last blower 84 or heater 86, the solvent from the coating material 22 has been flashed off and the coating material 22 remains on the desired threads 25 of the nuts 14 to be subsequently cured. An optional inspection station utilizing mirrors and lights can be presented on the upper conveyor system 36 at this point if so desired, in order to have the opportunity to visually inspect the nuts that have been coated to insure proper coverage. The coating material 22 on the nuts 14 at this point is no longer liquid and cannot flow or shift on the fastener surface. The coating material 22 may still be sticky to the touch and is uncured.

Once the parts leave the drying area 102, the upper magnetic rail 46 thereafter terminates and the strip 21 of fasteners 14 falls away from the belt 50. The strip 21 is then directed to a curing spool 54 which semiautomatically maintains a tension of the strip and respools the strip 21 of nuts 14 that now contain a barrier coating. The spool 54 is preferably constructed of a nonmagnetized metal and is mounted for rotation on a magnetized fixed hub 105. As the strip 21 of nuts 14 is lead to the spool 52, the magnetic force from the hub 105 attracts the end of the strip 21 and efficiently starts the winding process. The tensioning and respooling of the strip 21 is accomplished using a motor 94 connected to a slip clutch 96 that rotates the curing spool 54 as illustrated in FIG. 4A. The curing spool 54 winds the nuts 14 in a single width coil so that air and heat can reach all of the nuts evenly. The spool 54 is then removed from the device 10.

Once the spool 54 is removed from the device 10, it is placed alone or with other spools 54 on an oven conveyor where they are first subjected to the first stage of drying using fans blowing at room temperature. The spools 54 are subsequently heated in two stages, a first stage usually utilizing fast blowing air at about 250° F. and a second stage utilizing slow moving air at about 450° F. Since the hub 105 is magnetized rather than the spools 54, no degradation of the magnets occurs from exposing the spools to heat. The spool 54 is subsequently allowed to cool and the strip is threaded through an oiling station to apply a protective, but light, coat of oil to the nuts. The spooled nuts 14 are then ready for shipping.

Turning now to FIG. 13, another embodiment of the present invention is illustrated and generally referred to at 11. This embodiment is substantially identical to the previously described embodiment illustrated in FIG. 1, but differs in several important respects. In this embodiment, unconnected parts such as, for example, loose nuts 19 are fed in a uniformly centered orientation onto the belt 32 of the first conveyor system 24 by a known parts delivery system such as a vibratory feed bowl 15 and a track 17. Additionally, the present invention only requires successive parts to be centered on its belts. The amount or regularity of spacing between subsequent parts is immaterial. In this embodiment, the feed wheel 56 is utilized to help meter the nuts 19 onto the belt 32 at a controlled rate. Similarly, in this embodiment, once the individual nuts 19 are no longer exposed to the magnetic force of the upper magnetic rail 46, they simply drop off of the upper belt 50 and into a bin 90 for further processing.

This embodiment demonstrates an important feature of applicant's invention, namely, that it is capable of achieving heretofore unattainable processing speeds for application of barrier coating materials onto a variety of different parts or fasteners with superior coating results, regardless of whether the parts are fed to the machine individually or in an interconnected strip from a spool. Changeover and set up time required for coating parts of different types or sizes is likewise minimized as a result of the ease of adjustment of the belt speeds, guns and sensors. As illustrated, for example, in FIGS. 15–18, unlike the prior art, the present invention can efficiently process very small parts such as clinch nuts, parts with off center threaded openings such as stamped nuts, parts with multiple threaded openings such as tapping plates, or parts having extended vertical chimney-like structures.

The embodiment of the present invention illustrated in FIG. 13 also demonstrates other optional features of the present invention. At times it may be desired to sufficiently warm the fasteners 19 to influence the rapidity with which the later applied liquid coating material 22 will subsequently flow on the surfaces of the fasteners 19 that it is supplied to. An optional preheater 71 may be provided to raise the temperature of the fasteners 19 from room temperature to between about 100–150° F. upon exit from the preheater 71. Additionally, the previously described inspection station can be combined with a parts ejector to remove parts from the belt that do not meet the inspection criteria. A belt cleaning station 99 can also be provided that wipes any excess coating material off the belt 32 after each time the belt 32 passes through the liquid application section 101 and prior to the introduction of additional uncoated nuts 14 onto the belt 32.

The following examples are given to aid in understanding the invention. It is to be understood that the invention is not limited to the particular procedures or parameters set forth in those examples.

EXAMPLE 1

M6-1 pierce nuts were deposited onto the moving belt of a lower conveyor system of an apparatus as illustrated in FIG. 1. The parts were connected together by metal filaments and were fed in a strip from a spool mounted on a shaft. The length of the conveyor belt was approximately 28 feet long, which presented an approximately 14 foot track for the nuts to travel with the nuts being retained on the belt by the force of the magnetic rail thereunder and removed continuously by a conveyor belt driven by a two inch wide, ten inch diameter pulley near the point of introduction of the nuts in a two inch wide, ten inch diameter pulley located at the opposite end of the conveyor belt. The belt was constructed of a Teflon coated fiberglass reinforced material having a 0.030 inch square open mesh construction and was moving at a speed of about 17 feet per minute.

The nuts were cleaned by having a discrete shot of MEK solvent deposited into each respective threaded opening by a Nordson Zero Cavity gun having a Nordson #276515 gun module, with each shot being triggered by a Keyance PZ-101 optical sensor. The flow rate of the cleaning material from the gun was approximately 30 ounces per hour and the pressure was approximately 2 psi. Once the solvent was applied, the parts subsequently entered an exhaust enclosure where two blow-off ports blew into the threaded holes causing the MEK and loosened dirt and oil to atomize and be blown out of the now clean threads and vacuumed away.

The nuts then encountered two Nordson Zero Cavity gun with a #276515 Nordson module located on opposite sides of the belt. Each gun applied a single discrete shot of du Pont Teflon-S (954-101 green) and du Pont T-8748 thinner in a 70/30 mixture at room temperature. The discrete shot were triggered by a pair of Keyance PZ-101 optical sensors, one mounted opposite each of the guns. The discrete shots were placed on opposite sides of the internal threads of each nut.

The nuts with the coating material applied travelled approximately another two feet along the lower conveyor belt allowing a sufficient time for the coating material to wick and cover all of the threads. At that point, the lower magnetic rail of the lower conveyor system terminated and the nuts jumped onto the belt of an upper conveyor system that partially overlapped the lower conveyor system being attracted by the magnetic force of the upper magnetic rail above the belt. Once travelling on the upper belt, which was substantially the same as the lower belt and travelling at the same speed, the fasteners were passed through two foam blotting wheels with MEK solvent thereon in order to remove any excess coating material that may have been present on the bottoms of the fasteners once the blotting wheels were moving at the same speed as the nuts passing thereby.

The nuts then were carried by the upper conveyor past a set of drying fans that blew room temperature over the coated nuts to flash out the solvents and dry the coating material. The strip of nuts was then rewound on a take-up reel that was powered by a variable speed Bodine motor and driven through a slip clutch to keep the strip tension for a tight and neat wind around the reel. The reel was then removed from the coating apparatus and subjected to drying and curing as follows:

1. Five minutes drying in front of a fan blowing room temperature air onto the parts.
2. Ten minutes in the first stage of an oven-fast blowing air at about 250° F.
3. Ten minutes in second stage of oven-slow moving air at about 450° F.
4. The strip of fasteners was then led through an oiling station to apply a protective, but light, coat of oil to the fasteners. The parts were then reloaded back onto the customers spool and secured for shipping. Each of the nuts on the spool exhibited a substantially pinhole free coating.

M6 pierce nuts processed in the above-example were tested for conformance with General Motors Engineering Standard No. GM6076M entitled "Fluorocarbon Coating for Anti-Weld Splatter Electrodeposition Masking". Five pierce nuts were removed from each spool of 5,000 pieces for testing. The parts were electrostatically primed and baked to cure the primer then the parts were tested in the torque tension tester as instructed in the above-listed GM specification. The coating present on the nuts had a uniform appearance and was free of tears, runs and flaked areas. In addition, the cured coating was sufficiently damage resistant to prevent chipping or other coating removal during normal handling and shipping of the parts. The parts were then tested at 9 Newton meters of torque. The bolt and test pierce nuts should generate between 6 and 12 kilonewtons of clamp load in accordance with the GM specification. The sampled pierce nuts generated 7.9 kilonewtons of clamp force when 9 newton meters of torque was applied, thereby meeting torque tension requirements of General Motors standard.

EXAMPLE 2

M8 weld nuts made of plain steel having a 1¼" diameter and a total thickness, including boss and weld studs, of 0.375" were fed from a vibratory bowl through a downtrack on a 30° incline onto the moving belt of a lower conveyor system of an apparatus as illustrated in FIG. 13. The details of the apparatus and process were the same as those set forth in Example 1 above, except as indicated hereafter.

The nuts were carried by the lower conveyor belt in centered, end-to-end configuration through a station where liquid coating material was delivered into the threads of each nut, covering parts of all but the bottom thread. Two dispensing guns were used and placed 180° apart from one another, to each deliver a single metered shot of liquid coating material to the opposite sides of each threaded area. The discrete shots of liquid material were fired by the guns having a shot duration of 30 milliseconds. The belt speed was approximately 19.5 feet/minute. The pot pressure of the liquid material delivered to the fasteners was approximately 23.4 psi. The material applied to the weld nuts was delivered at room temperature and contained a mixture of about 70% Whitford XYLAN® 1661 high build purple dry film lubricant and about 30% of a solvent mixture containing N methyl pyrrolidone (NMP) and XYLENE®.

The nuts were then transferred to the upper conveyor system where they were suspended from and moved by a conveyor belt, being held against the moving belt by the force of a magnet located above the rail. The nuts then passed through a blotter station where any excess material was removed from the faces of the nuts. The nuts were then carried by the upper conveyor past a set of transflow blowers that blew room temperature air over the coated nuts to assist in flashing out the solvents and drying the coating material. The nuts were then dropped onto an intermediate conveyor with blowers to further dry the parts for approximately 30 seconds. The nuts were placed in a curing oven with two heat zones. The first zone exposed the nuts to a first stage of heating in an oven with fast moving air at a temperature of about 180° F. The nuts were then exposed to a second stage of heating in an oven with slow moving air at a temperature of about 480° F. for 10 minutes.

Each of the nuts processed exhibited a substantially pinhole free fluorocarbon coating. Nuts processed in this example were then tested for conformance with General Motors Engineering Standard #GM6076M. The coating present on the nuts had a uniform appearance and was free of tears, runs and flaked areas. In addition, the cured coating was efficiently damage resistant to prevent chipping or other coating removal during normal handling and shipping of the parts. The sampled test nuts also met the torque tension and weld splatter requirements of General Motors Standard #6076M.

From these examples, the benefits of the present invention can be seen in the high speed application of liquid barrier coating materials to a continuous stream of parts such as fasteners in a very precise manner.

Having thus described our invention, we claim:

1. An apparatus for moving a plurality of fasteners for processing, said apparatus comprising:

a first conveyor having a removable surface adapted to engage a first surface of each of said plurality of fasteners and to move said fasteners along said first conveyor;

a second conveyor having a movable surface adapted to engage a second surface of each of said plurality of fasteners and to move said fasteners along said second conveyor;

a first attraction device adapted to magnetically attract said fasteners so that, along a predetermined portion of said first conveyor, said fasteners remain against said movable surface of said first conveyor; and a second attraction device adapted to magnetically attract said fasteners away from said movable surface of the first conveyor and into contact with said movable surface of the second conveyor when said fasteners are moved beyond said predetermined portion by said first conveyor, said first and second attraction devices being adapted to effect such transfer of said fasteners from said first conveyor to said second conveyor even when such a transfer is in a direction opposed by gravity, wherein said movable surface of said first conveyor and said movable surface of said second conveyor are at least partially overlapped to define an overlap region.

2. The apparatus of claim 1, wherein said first and second attraction devices are adapted to effect transfer of said fasteners from said movable surface of said first conveyor to said movable surface of said second conveyor even if there is no pneumatic mechanism for releasing said fasteners from the effect of said first attraction device.

3. The apparatus of claim 1, wherein said movable surface of said first conveyor and said movable surface of said second conveyor are spaced apart from one another to accommodate said fasteners therebetween.

4. The apparatus of claim 1, wherein said first conveyor is located below said second conveyor in said overlap region so tat said first attraction device holds said fasteners down against said movable surface of said first conveyor to permit forceful processing of said fasteners along said predetermined portion without said fasteners becoming disengaged from said movable surface of said first conveyor in said predetermined portion; and wherein said second attraction device magnetically attracts said fasteners upwardly away from said movable surface of said first conveyor as said fasteners move through said overlap region and out of said predetermined portion.

5. The apparatus of claim 4, wherein said first and second attraction devices are arranged with respect to one another so that, in said overlap region:

a first magnetic attraction applied to said fasteners by said first attraction device progressively decreases in the direction of fastener movement; and a second magnetic attraction applied to said fasteners by said second attraction device progressively increases in the direction of fastener movement, whereby said second magnetic attraction eventually overcomes said first magnetic attraction as said fasteners move through the overlap region to effect said transfer of the fasteners from said first conveyor to the second conveyor.

6. The apparatus of claim 5, wherein said first and second attraction devices are arranged so that, outside of said overlap region:

said first magnetic attraction applied to said fasteners by said first attraction device remains substantially constant along a length of said first attraction device; and said second magnetic attraction applied to said fasteners by said second attraction device remains substantially constant along a length of said second attraction device.

7. The apparatus of claim 4, wherein said first and second conveyors are arranged with respect to one another so as to convey said fasteners in substantially the same direction.

8. The apparatus of claim 4, wherein said first and second conveyors are arranged so as to move said fasteners linearly.

9. The apparatus of claim 4, wherein said first and second conveyors are arranged so that said first surface of the fasteners becomes exposed when said second surface of said fasteners engages said movable surface of said second conveyor.

10. The apparatus of claim 9, wherein said first and second conveyors are arranged so that said second surface of the fasteners is exposed while said first surface of the fasteners engages said movable surface of the first conveyor.

11. The apparatus of claim 3, wherein said first and second attraction devices are adapted to effect transfer of said fasteners from said first conveyor to said second conveyor regardless of whether said fasteners abut one another in the direction of movement.

12. The apparatus of claim 1, wherein said first conveyor is located below said second conveyor, said movable surface of said first conveyor being arranged so as to face at least a portion of said movable surface of said second conveyor;

wherein said movable surface of said first conveyor is located between said first attraction device and said fasteners such that said first attraction device magnetically holds said fasteners down against said movable surface of said first conveyor to permit forceful processing of said fasteners along said predetermined portion without said fasteners becoming disengaged from said movable surface of said first conveyor in said predetermined portion; and wherein said second attraction device magnetically attracts said fasteners upwardly away from said movable surface of said first conveyor as said fasteners move out of said predetermined portion.

13. The apparatus of claim 1, wherein said first and second attraction devices are arranged with respect to one another so that, as said fasteners move out of said predetermined portion:

a first magnetic attraction applied to said fasteners by said first attraction device progressively decreases in the direction of fastener movement; and a second magnetic attraction applied to said fasteners by said second attraction device progressively increases in the direction of fastener movement, whereby said second magnetic attraction eventually overcomes said first magnetic attraction as said fasteners move out of said predetermined portion to effect said transfer of the fasteners from said first conveyor to the second conveyor.

14. The apparatus of claim 1, wherein said first and second conveyors are arranged with respect to one another so as to convey said fasteners in substantially the same direction.

15. The apparatus of claim 1, wherein said first and second conveyors are arranged so as to move said fasteners linearly.

16. The apparatus of claim 1, wherein said first and second conveyors are arranged so that said first surface of the fasteners becomes exposed when said second surface of said fasteners engages said movable surface of said second conveyor.

17. The apparatus of claim 16, wherein said first and second conveyors are arranged so that said second surface of the fasteners is exposed while said first surface of the fasteners engages said movable surface of the first conveyor.

18. The apparatus of claim 1, wherein said first and second attraction devices are adapted to effect transfer of said fasteners from said first conveyor to said second conveyor regardless of whether said fasteners abut one another in the direction of movement.

19. The apparatus of claim 1, wherein said fasteners are interconnected in the direction of movement and wherein said first and second attraction devices are adapted to effect transfer of said fasteners from said first conveyor to said second conveyor despite interconnection of said fasteners.

20. The apparatus of claim 1, wherein said first conveyor is located sufficiently close to a fastener processing station that processing of said fasteners is effected while said fastener are located on said first conveyor.

21. The apparatus of claim 20, wherein said second conveyor is located sufficiently close to an additional processing station that further processing of said fasteners is effected while said fasteners are being moved by said second conveyor.

22. An apparatus for moving a plurality of fasteners for processing, said apparatus comprising:

first means for engaging a first surface of each of said plurality of fasteners and moving said fasteners along said first means;

second means for engaging a second surface of each of said plurality of fasteners and for moving said fasteners along said second means;

third means for magnetically attracting said fasteners so that, along a predetermined portion of said first means, said fasteners remain against said first means; and fourth means for magnetically attracting said fasteners away from said first means and into contact with said second means when said fasteners are moved beyond said predetermined portion by said first means, said third and fourth means being adapted to effect such transfer of said fasteners from said first means to said second means even when such a transfer is in a direction opposed by gravity, wherein said movable surface of said first conveyor and said movable surface of said second conveyor are at least partially overlapped to define an overlap region.

23. The apparats of claim 22, wherein said first and second means are arranged so that said first surface of said fasteners is exposed when said fasteners are being moved by said second means.

24. The apparatus of claim 23, wherein said first and second means are arranged so that said second surface of said fasteners remains exposed when said fasteners are being moved by said first means.

25. The apparatus of claim 22, wherein said third and fourth means are adapted to effect transfer of said fasteners from said first means to said second means even if there is no pneumatic mechanism for releasing said fasteners from the effect of said third means.

26. The apparatus of claim 22, wherein said third and fourth means are arranged so that, in said overlap region:

a first magnetic attraction applied to said fasteners by said third means progressively decreases in the direction of fastener movement; and a second magnetic attraction applied to said fasteners by said fourth means progressively increases in the direction of fastener movement, whereby said second magnetic attraction eventually overcomes said first magnetic attraction as said fasteners move though the overlap region to effect said transfer of the fasteners from said first means to said second means.

27. The apparatus of claim 22, wherein said first means is located below said second means outside of said predetermined portion so that said third means holds said fasteners down against said first means to permit forceful processing of said fasteners along said predetermined portion without said fasteners becoming disengaged from said first means in said predetermined portion; and wherein said fourth means magnetically attracts said fasteners upwardly away from said first means as said fasteners move out of said predetermined portion.

28. A method of moving a plurality of fasteners for processing, comprising the steps of:

magnetically attracting said fasteners to a first movable surface;

moving said first movable surface so that said fasteners move along with said first movable surface while being magnetically attracted toward said first movable surface with sufficient force to permit forceful processing of said fasteners without said fasteners becoming dislodged from said first movable surface during such forceful processing;

magnetically attracting said fasteners to a second movable surface with sufficient force to effect transfer of said fasteners to said second movable surface even when gravity is in a direction opposite to such transfer, said second movable surface being overlapped with said first movable surface; and moving said second movable surface so that said fasteners move along with said second movable surface while being magnetically attracted toward said second movable surface.

29. The method of claim 28, wherein said steps of magnetically attracting said fasteners to said second movable surface and moving said second movable surface further comprise the step of exposing a surface of said fasteners which, during movement along the first movable surface, remained unexposed.

30. The method of claim 28, wherein said first movable surface is upward facing and said second movable surface is downward facing;

said step of magnetically attracting said fasteners to said first movable surface comprises magnetically attracting said fasteners downwardly against said first movable surface; and said step of magnetically attracting said fasteners to said second movable surface comprises magnetically attracting said fasteners upwardly against said second movable surface and away from said first movable surface.

31. The method of claim 28, wherein said step of moving said first movable surface is performed while adjacent ones of said fasteners abut against one another.

32. The method of claim 28, wherein said step of attracting said fasteners toward said second movable surface is performed without requiring an air stream to release said fasteners from the magnetic attraction toward said first movable surface.

33. The method of claim 22, wherein said fasteners are interconnected and wherein transfer of said fasteners from said first movable surface to said second movable surface is effected despite interconnection of said fasteners.

* * * * *